Dec. 15, 1936.   E. BAUSCH ET AL   2,064,368
PROJECTION APPARATUS
Filed Jan. 18, 1935   2 Sheets-Sheet 2
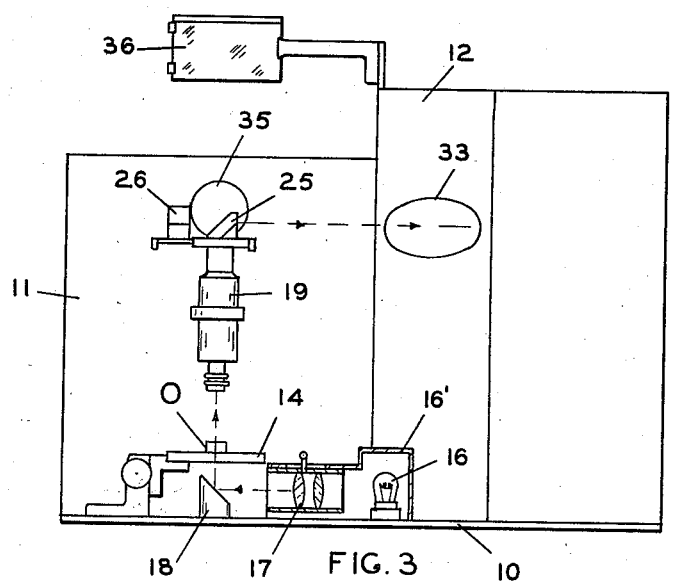
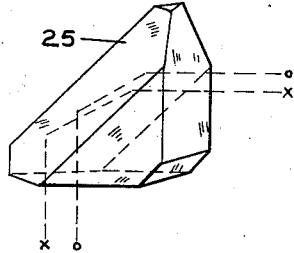
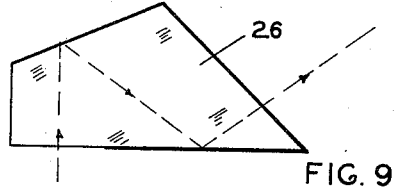
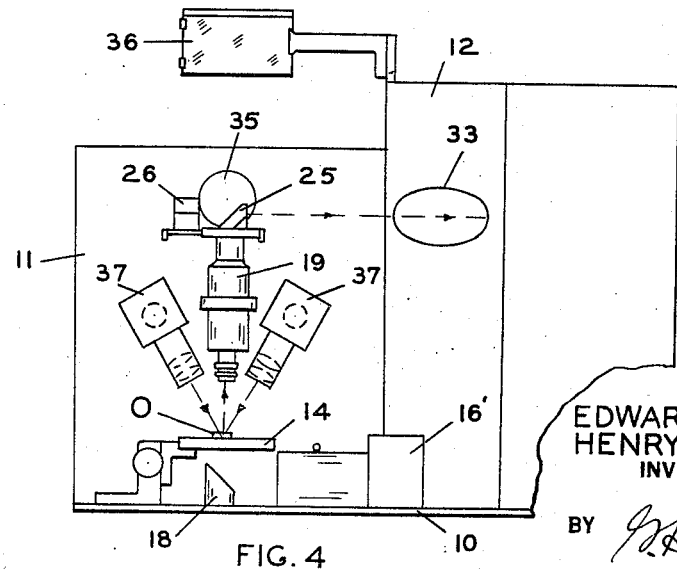
EDWARD BAUSCH
HENRY F. KURTZ
INVENTOR
BY
ATTORNEY Patented Dec. 15, 1936

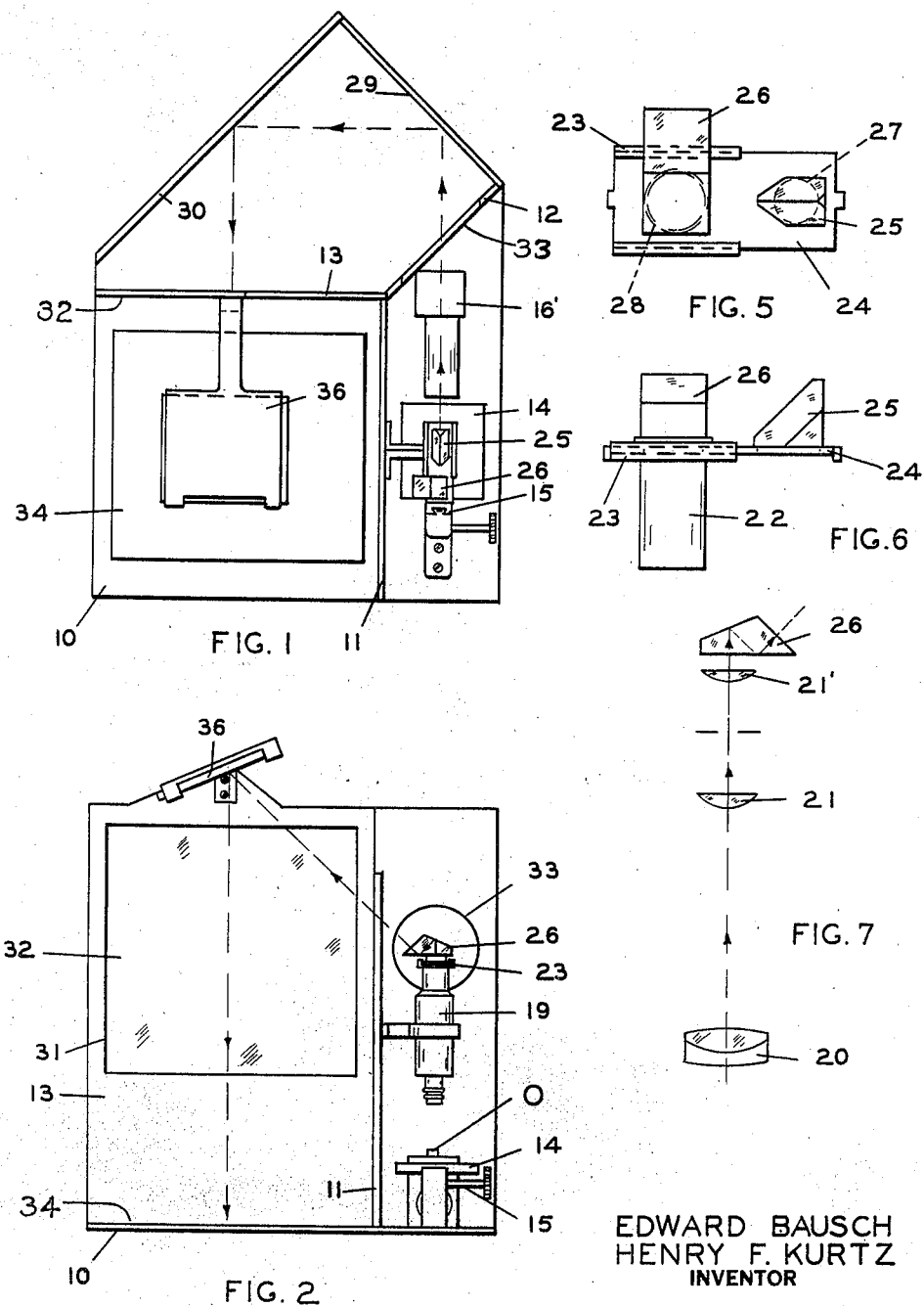

2,064,368

UNITED STATES PATENT OFFICE 2,064,368

PROJECTION APPARATUS

Edward Bausch and Henry F. Kurtz, Rochester, N. Y., assignors to Bausch & Lomb Optical Company, Rochester, N. Y., a corporation of New York Application January 18, 1935, Serial No. 2,378

4 Claims. (Cl. 88—24)

This invention relates to optical instruments and more particularly it has reference to an apparatus which may be utilized for measuring, gaging and inspecting screw threads, gears, pinions and other objects by projecting onto a screen or chart an image of the contour or profile of the object.

One of the objects of this invention is to provide an improved means for projecting onto a screen an image of a screw, pinion, gear or other object which is to be measured, gauged or inspected. Another object is to provide a device of the type described which will be relatively rugged and simple in structure yet efficient in operation and adapted for use by the average mechanic or factory worker. A further object is to provide a device of the type described in which an erect, normal image of the object can be selectively projected onto either of two angularly disposed screens. These and other objects and advantages reside in certain novel features of construction, arrangement and combination of parts as will hereinafter be more fully described and pointed out in the appended claims.

Referring to the drawings:

Fig. 1 is a top plan view of a device embodying our invention.

Fig. 2 is a front elevation of same.

Fig. 3 is a side elevation of same.

Fig. 4 is a side elevation showing a modification of the illuminating system.

Fig. 5 is a top plan view of the prism slide.

Fig. 6 is a side elevation of same.

Fig. 7 is a diagrammatic view of the lens system and one of the reflecting prisms.

Fig. 8 is a view showing the path of light rays through the roof prism.

Fig. 9 shows the path of light rays through the other prism.

One embodiment of our invention is illustrated in the drawings wherein 10 indicates a base having the vertical supporting wall members 11, 12, and 13. Slidably mounted on base 10 is the object holder 14 which may be vertically adjusted by means of a rack and pinion 15. The object holder 14 preferably takes the form of a transparent glass plate so that an object O may be supported thereon in the path of light rays which emanate from lamp 16, in house 16', pass through the condenser lenses 17 and are thence directed upwardly by means of the reflector 18. Fixedly mounted on the wall 11 is a tube 19 carrying an objective 20 at its lower end and at its upper end the two lenses 21 and 21' which constitute an eyepiece.

Mounted within tube 19, at its upper end, is a short tube 22 carrying a grooved member 23 which provides ways for the slide 24. Mounted in spaced relation on slide 24 are the two prisms 25 and 26 which are positioned, respectively, over the openings 27 and 28 in the slide 24. It will thus be apparent that either prism 25 or 26 may be selectively positioned above tube 19 in position to receive light rays which have passed up through tube 19.

Secured to the rear of base 10 are the two vertical, angularly disposed reflectors 29 and 30. The wall 13 has an opening 31 in which is mounted a translucent screen 32 which may be formed of ground glass or other suitable material.

With the roof prism 25 in operative position, as shown in Figs. 1 and 3, light rays pass upwardly through tube 19 to the under side of prism 25 and are thence directed horizontally through the opening 33 onto the reflectors 29 and 30 and thence onto the translucent screen 32. The lens system, roof prism and reflectors cooperate to produce on the translucent screen 32 an image of the object O which will appear erect and normal as viewed by an observer from the front side of the instrument.

If it is desired to produce the image on the horizontal screen 34, mounted on base 10, the slide 24 is moved so as to bring prism 26 above tube 19 in operative relation as shown in Fig. 2. With this arrangement, light rays pass up through tube 19 to prism 26, are successively reflected and directed through opening 35 onto mirror 36, supported on wall 13, and thence reflected down onto screen 34. The image of object O produced on the horizontal screen 34 will appear erect and normal to an observer stationed at the front of the instrument. The paths of light rays through the prisms 25 and 26 are illustrated, respectively, in Figs. 8 and 9.

A modified form of illuminating system, shown in Fig. 4, comprises two lamp houses 37 which are mounted on the wall 11 and adapted to direct light rays down on top of the object O and thereby afford what is known as opaque illumination.

From the foregoing it will be apparent that we are able to attain the objects of our invention and provide an improved projection apparatus of the type described having means for selectively projecting an image of an object onto a vertical or horizontal screen. For certain classes of work it is more convenient to have the image projected onto a vertical screen and for other types of work it may be more convenient to have the image projected onto a horizontal screen. By means of our invention either type of projection may be readily and conveniently obtained at the will of the operator. It should be especially noted that on both our vertical and horizontal screens erect, normal images are produced. This is an important feature since it prevents confusion which might be caused by inverted or reverted images and so adapts the instrument for efficient use by relatively unskilled operators or factory workers. Various modifications can obviously be made without departing from the spirit of our invention.

We claim:

1. An instrument of the type described comprising an object holder, means for illuminating an object on said holder, a horizontal screen, a vertical screen, a lens system positioned above said object holder so as to receive light rays from the object, two angularly disposed, vertical, reflecting members positioned adjacent the vertical screen, a single reflector positioned above the horizontal screen and means above said lens system for selectively holding in operative relation thereto a prism for cooperating with said vertical reflecting members to project an erect, normal image of said object on said vertical screen or a prism for cooperating with said single reflector to project an erect, normal image of said object on said horizontal screen.

2. An instrument of the type described comprising an object holder, means for illuminating an object on the holder, a lens system comprising an objective and an eyepiece positioned above said holder and in alignment therewith, a vertically positioned, translucent screen, two vertically positioned, angularly disposed reflecting members positioned laterally of said screen and in alignment therewith, and a right-angled roof prism positioned above said lens system in position to direct light rays onto said members whereby light rays passing through the lens system are directed onto said reflecting members and thence onto said screen so as to produce a normal, erect image of the object.

3. A device of the character described comprising an object holder, means for directing light onto an object on said holder, a vertical screen positioned above the plane of said holder, a horizontal screen positioned below the plane of said holder, a lens system positioned above said holder to receive light rays from the object, a pair of prisms movably mounted above said system and adapted to be selectively positioned in operative relation therewith, one of said prisms being a right angled roof prism, the other prism having angularly disposed faces providing two successive reflections for light rays from said system, a pair of angularly disposed, vertical reflectors positioned laterally of said system to receive light rays from the roof prism, successively reflect them and then direct them onto said vertical screen, and a reflector positioned above said horizontal screen in position to receive light rays from said other prism and direct them onto said horizontal screen.

4. A device of the type described comprising an object holder, means for illuminating an object on said holder, a vertical, translucent screen, and optical means for projecting onto said screen an image which will appear erect and normal when the screen is viewed in a direction opposite that in which the light rays travel when they strike the screen, said optical means comprising an objective and a cooperating eyepiece positioned above said holder, a right-angled roof prism above said eyepiece and a pair of angularly disposed vertical reflectors positioned laterally of said holder and constructed and arranged so that light rays from said prism are successively reflected thereby and directed onto said screen.

EDWARD BAUSCH.
HENRY F. KURTZ.